United States Patent Office 3,483,299
Patented Dec. 9, 1969

3,483,299
HYPOTENSIVE METHOD AND COMPOSITIONS USING l-α-PHENYLETHYLGUANIDINE
Albert Lawrence Green and Roy Fielden, Welwyn Garden City, England, assignors to Smith Kline & French Laboratories, Philadelphia, Pa., a corporation of Pennsylvania
No Drawing. Filed Jan. 18, 1965, Ser. No. 426,417
Claims priority, application Great Britain, Jan. 24, 1964, 3,255/64
Int. Cl. A61k 27/00
U.S. Cl. 424—326                 4 Claims

ABSTRACT OF THE DISCLOSURE

New medicinal compositions and method are described for producing hypotensive or blood pressure lowering activity. The compositions and methods contain as an active chemical ingredient the active isomer, l-α-phenylethylguanidine.

---

This invention relates to new pharmaceutical compositions and is concerned with pharmaceutical compositions having hypotensive activity. This invention also relates to a new method of inducing hypotensive activity in animals.

In accordance with the invention there is provided a pharmaceutical composition in dosage unit form comprising as an essential active ingredient l-α-phenylethylguanidine (also known as l-α-methylbenzylguanidine) or a pharmaceutically acceptable acid addition salt thereof.

The term "dosage unit form" is used herein as meaning a physically discrete unit containing an individual quantity of the active ingredient, said quantity being such that one or more such units are required for a single therapeutic administration.

The dosage unit of the compositions of the invention may exist in any of the forms customarily employed for a particular mode of administration. Thus for oral administration the dosage unit may take the form of a tablet, capsule, pill, cachet, sachet or packaged powder, or a given quantity, e.g., a teaspoonful, of a solution or suspension; for parenteral administration it may take the form of a sterile solution packaged in a disposable container such as an ampule; and for rectal administration it may take the form of a suppository.

Although in some dosage unit forms the active ingredient might be contained therein per se, for example when the active ingredient is contained in an orally ingestible container such as a capsule, for example a hard or soft gelatin capsule, or in a disposable container such as an ampule, in most instances the active ingredient will be present in the dosage unit in admixture with a pharmaceutical diluent or excipient therefor, for example maize starch, terra alba, sucrose, talcum, distilled water, stearic acid, or gelatin.

The amount of the active ingredient in the dosage unit may vary providing that there is sufficient thereof to have the required pharmacological effect when one or more dosage units are administered. Thus each dosage unit may contain, for example from about 1 to 200 mg., preferably about 1 to 100 mg., of the active ingredient, and the total daily dose of the active ingredient may be from about 2 to about 200 mg. which may be taken if desired in a single administration since the effect of the active compound is long lasting. Alternatively more than one, for example up to six, dosage units may be administered daily to induce the desired hypotensive effect. The dosage unit may contain one or more other pharmacologically active ingredients in addition to the l-α-phenylethylguanidine but this active ingredient should be substantially free from its d-isomer for the unexpected reasons detailed hereafter.

It has been found that the compound l-α-phenylethylguanidine is markedly effective in causing a selective block of conduction in postganglionic adrenergic neurones and this results in a fall in blood pressure. The corresponding dextrorotatory isomer is 10 to 20 times less active and in addition, surprisingly and by different mechanisms, causes an *elevation* of the blood pressure. Furthermore the d-iomer is a powerful antagonist of the beneficial effects of the laevorotatory isomer. As a consequence of this specificity of action of the l-isomer, the pharmaceutical compositions of the invention containing the l-isomer are useful as hypotensive agents. It has in fact been established in animal tests that the l-isomer is twice as active as a hypotensive agent as the known compound bretylium tosylate.

The invention thus also provides a method of reducing blood pressure comprising the internal administration of an effective dose of l-α-phenylethylguanidine (substantially free from d-α-phenylethylguanidine) or a pharmaceutically acceptable acid addition salt thereof. Preferably this method is used by administering internally, preferably orally, the dosage units described above containing an effective amount of substantially pure l-α-phenylethylguanidine to a hypertensive subject thereby inducing the desired blood pressure lowering.

It will be appreciated that the essential active ingredient in the compositions of the invention is either the pure l-isomer or l-isomer substantially free of d-isomer. The dl-isomeric mixture and the l-isomer of the active ingredient are described in Annalen 487, 294 (1931). No report of biological activity is however contained in this reference.

l-α-Phenylethylguanidine is prepared by reacting the corresponding amine with a salt of S-methylisothiourea, for example S-methylisothiouronium sulfate, in an aqueous medium to obtain the corresponding guanidine salt, which can be converted into either the free base or into another stable nontoxic salt using standard procedures. The following illustrates the preferred preparation of a salt of l-α-phenylethylguanidine.

l-α-Phenylethylamine (15.2 g.), S-methylisothiouronium sulfate (16.8 g.) and water (30 ml.) are heated at 80–90° C. for 30 minutes and then at 100° C. for a further hour. The reaction mixture is cooled and a solution of potassium bicarbonate (12 g.) in water (60 ml.) is added. l-α-Phenylethylguanidine bicarbonate is precipitated and is separated by filtration, the collected precipitate then being made into a slurry with water (30 ml.). To hot 2 N nitric acid (60 ml.) is added the slurry and, on cooling, the nitrate salt of l-α-phenylethylguanidine separates initially as an oil which later crystallizes as a solid, M.P. 90–92° C. Recrystallization from water raises the M.P. to 92–93° C.

Salts other than the nitrate may be prepared in a similar manner, for example the sulfate may be obtained by using sulfuric acid instead of nitric acid.

The following examples illustrate the formulation of pharmaceutical compositions in accordance with the invention.

EXAMPLE 1

Tablets are prepared by mixing and granulating in accordance with known pharmaceutical techniques the following ingredients:

| Ingredient: | Mg./tablet |
|---|---|
| l-α-Phenylethylguanidine sulfate | [1]6.5 |
| Maize starch | 24.0 |
| Terra alba | 235.0 |
| Powdered sucrose | 10.0 |
| Gelatin (as 5% w./v. aqueous solution) | 2.0 |
| Talcum | 3.0 |
| Stearic acid | 3.0 |

[1] ≡5mg. of free base.

One or more of the tablets are administered orally to lower blood pressure.

EXAMPLE 2

Tablets are prepared by mixing and granulating in accordance with known pharmaceutical techniques the following ingredients:

| Ingredient: | Mg./tablet |
|---|---|
| l-α-Phenylethylguanidine sulfate | [1]65.0 |
| Maize starch | 29.0 |
| Terra alba | 286.0 |
| Powdered sucrose | 11.0 |
| Gelatin (as 5% w./v. aqueous solution) | 2.5 |
| Talcum | 3.5 |
| Stearic acid | 3.5 |

[1] ≡5mg. of free base.

A tablet prepared as described is administered to a hypertensive subject to induce a lowering of blood pressure.

EXAMPLE 3

Capsules each of the following composition are made up by mixing together the ingredients and filling the resulting mixture into gelatin capsules:

| | Mg. |
|---|---|
| l-α-Phenylethylguanidine sulfate | 130 |
| Lactose | 20 |

A capsule thusly prepared is administered orally to induce a hypotensive effect.

EXAMPLE 4

Capsules each of the following composition are made up by mixing together the ingredients and filling the resulting mixture into gelatin capsules:

| | Mg. |
|---|---|
| l-α-Phenylethylquanidine sulfate | 13 |
| Lactose | 112 |

One or more of said capsules are administered orally.

EXAMPLE 5

An injection solution is prepared from the following ingredients:

| | Percent w./v. |
|---|---|
| l-α-Phenylethylguanidine sulfate | 0.65 |
| Phenylmercuric acetate | 0.001 |
| Distilled water, q.s. to 100 ml. | |

This solution is filtered through a bacteria-proof filter and transferred aseptically to sterilized glass ampules in 2 ml. quantities each, which are then sealed aseptically. Each ampule thus contains a 10 mg. dose of the active compound (calculated as the free base).

The injectable preparation is administered parenterally to induce a hypotensive effect.

What we claim is:

1. A pharmaceutical composition for producing hypotensive activity in dosage unit form comprising a tablet, capsule, pill, suppository or sterile parenteral solution containing from about 1–200 mg. of l-α-phenylethylguanidine essentially free from d-α-phenylethylguanidine or a nontoxic acid salt of the l-isomer formed with a pharmaceutically acceptable mineral acid.

2. A method of reducing blood pressure comprising the internal administration to a hypertensive subject of an effective but nontoxic dose of a compound selected from the group consisting of l-α-phenylethylguanidine essentially free from d-α-phenylethylguanidine and a nontoxic addition salt thereof with a pharmaceutically acceptable acid.

3. The method of claim 2 in which the effective dose is from about 2 to about 200 mg.

4. The method of claim 2 in which the administration is orally.

References Cited

UNITED STATES PATENTS 3,377,245   4/1968   Fielden et al. _____ 424—326

OTHER REFERENCES

Kuntzman et al.: Chemical Abstracts, vol. 57, col. 2798–2799 (1962).

Kroneberg et al.: Chemical Abstracts, vol. 52, col. 20672(d) (1958).

Harwood Chemical Abstracts, vol. 27, col. 1676(5) (1933).

Karrer Organic Chemistry, pp. 92–101 (1946).

FRANK CACCIAPAGLIA JR., Primary Examiner